Sept. 16, 1941.  H. FRICKE  2,256,245
MICROSCOPE
Filed Feb. 1, 1939
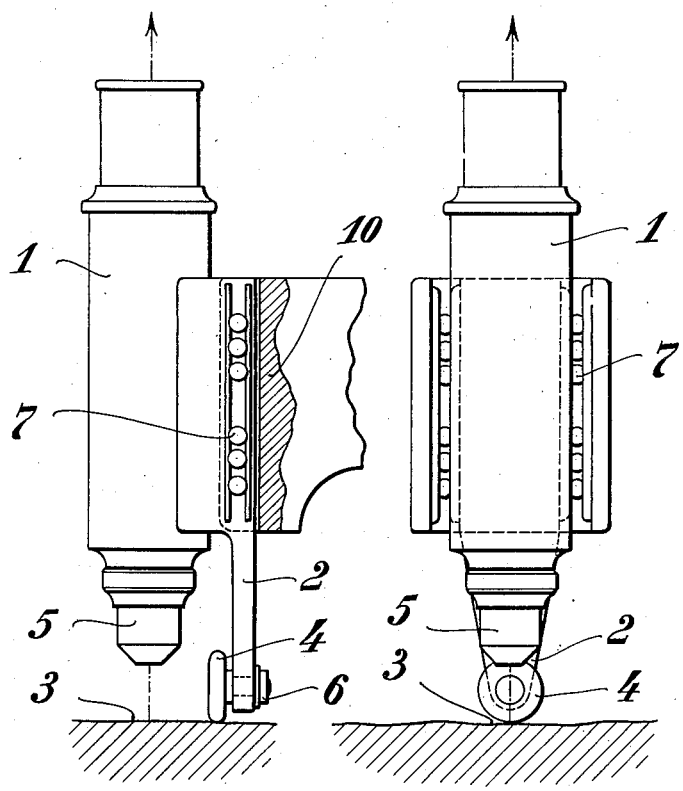
INVENTOR
Hans Fricke
BY
ATTORNEY Patented Sept. 16, 1941

2,256,245

UNITED STATES PATENT OFFICE 2,256,245

MICROSCOPE

Hans Fricke, Wetzlar, Germany, assignor to Ernst Leitz, G. m. b. H., Wetzlar, Germany Application February 1, 1939, Serial No. 253,963
In Germany March 24, 1938

1 Claim. (Cl. 88—39)

This invention relates to microscopes and the object of the invention is to provide a microscope which shall be particularly well adapted for microscopic examinations of objects which have a relatively great surface area which is to be examined at several points thereof.

In such cases it is usual to move the object under the microscope tube whereby to bring successively the several spots to be examined directly underneath the objective. If now the surface of the object is uneven and includes high and low spots or points it follows that the microscope must be focused specially for each point to be examined. Such practice may lead to inexact focusing and, in any event, it is necessary to check the focusing for each spot to be examined.

This disadvantage is eliminated in a microscope according to this invention in which the microscope tube is provided with an element which moves up or down according to the surface contour of the object and whereby the objective of the microscope is also moved up and down and thus at all times is exactly focused. Said element is secured to the microscope tube and may conveniently be provided with a suitable member for contacting the surface of the object and whereby the microscope tube is automatically raised or lowered as aforesaid. The invention in its simplest form is illustrated in the accompanying drawing in which Fig. 1 is a side view of so much of a microscope as is necessary to understand the invention.

Fig. 2 is a view at right angle to Fig. 1. In both of said figures parts are broken away and omitted.

The reference numeral 10 denotes the usual tube supporting arm of a microscope. The arm may be of any usual or well known construction, either relatively fixed or relatively movable with respect to the object 3. It will further be understood that the microscope is provided with the usual coarse and fine adjustments and other well known parts. These parts are not shown as they form no part of this invention.

The microscope tube 1 carries in any suitable manner a member 2 for maintaining the objective 5 in correctly focused distance above the object 3. The member 2 may be provided with any suitable surface contacting end member 4. The latter may be a roller such as shown or any other equivalent element which will permit the object to be moved easily thereunder. The size and character of the member 4 will of course be selected to suit the local requirements. Conveniently the member 4 may be detachably mounted as by a threaded stem and nut 6 as will be understood. This facilitates exchange of surface contacting members.

Preferably the tube 1 and member 2 are vertically movable with respect to the arm 10 by means of a suitable ball bearing mechanism as indicated at 7. Such arrangement is known in the art and is therefore shown conventionally.

In operation the microscope is placed near the object with the tube 1 and contacting member 2 reaching in over the object, the contacting end member 4 resting upon the same. The objective is then focused for examination. When thereafter the object is moved in under the objective, the tube 1 and contacting member 2 will move up or down according to the surface contour of the object. However, the focusing distance between the objective and the object will not be disturbed but remains constant.

Depending upon the size and character of the surface to be examined the arm 10 of the microscope may be lengthened or may be made swingable. Other means may be added for balancing or other purposes. Such means or mechanisms are not shown because such constructions are within the scope of persons skilled in the art.

I claim:

In a microscope for examining an object which is moved laterally under the microscope objective during the examination while the microscope is held laterally immovable relative to the object, said microscope comprising a supporting arm, a microscope tube with objective thereon, means for supporting said tube and objective upon said arm in vertically movable relation thereto, a member connected to said tube and movable therewith, said member extending below said objective for continuously contacting and resting upon the surface of the object to be examined to automatically raise and lower said tube and objective in response to surface irregularities in the object whereby to maintain said objective in predetermined focused relation to said surface at any point thereof passing under the objective and a surface contacting roller carried by said member.

HANS FRICKE.